(12) United States Patent
Mune et al.

(10) Patent No.: US 7,267,931 B2
(45) Date of Patent: *Sep. 11, 2007

(54) PROCESS FOR PRODUCING OPTICAL WAVEGUIDE

(75) Inventors: Kazunori Mune, Osaka (JP); Amane Mochizuki, Osaka (JP); Yusuke Shimizu, Osaka (JP); Ryuusuke Naitou, Osaka (JP); Hideyuki Usui, Osaka (JP)

(73) Assignee: Nitto Denko Corporation, Osaka (JP)

( * ) Notice: Subject to any disclaimer, the term of this patent is extended or adjusted under 35 U.S.C. 154(b) by 88 days.

This patent is subject to a terminal disclaimer.

(21) Appl. No.: 11/194,456

(22) Filed: Aug. 2, 2005

(65) Prior Publication Data

US 2006/0029891 A1    Feb. 9, 2006

(30) Foreign Application Priority Data

Aug. 2, 2004   (JP) ................... P.2004-226016

(51) Int. Cl.
  *G02B 6/13*   (2006.01)
(52) U.S. Cl. .................................... 430/321
(58) Field of Classification Search ...... None
  See application file for complete search history.

(56) References Cited

U.S. PATENT DOCUMENTS

| | | | |
|---|---|---|---|
| 5,462,700 A * | 10/1995 | Beeson et al. ............ | 264/1.27 |
| 6,477,284 B1 * | 11/2002 | Oda et al. ................ | 385/14 |
| 2004/0005109 A1 | 1/2004 | Tsushima et al. | |
| 2005/0201714 A1 * | 9/2005 | Mune et al. ............. | 385/143 |

FOREIGN PATENT DOCUMENTS

| | | |
|---|---|---|
| EP | 1 538 465 A1 | 6/2005 |
| JP | 10-268152 A | 10/1998 |
| JP | 2002-47335 A | 2/2002 |

OTHER PUBLICATIONS

Patent Abstracts of Japan—2001192433 (2001) Sakamoto Hironori "Epoxy Resin Composition and its Cured Product".
European Search Report dated Nov. 22, 2005.

* cited by examiner

*Primary Examiner*—John A McPherson
(74) *Attorney, Agent, or Firm*—Sughrue Mion, Pllc.

(57) ABSTRACT

The present invention provides a process for producing an optical waveguide, comprising the steps of: continuously applying a fluorene derivative layer onto a continuous substrate and curing the layer to thereby form a lower cladding layer; continuously applying a photosensitive fluorene derivative layer onto the lower cladding layer; continuously exposing the applied photosensitive fluorene derivative layer to a light through a photomask having a predetermined pattern; continuously subjecting the exposed photosensitive fluorene derivative layer to post-exposure heating; continuously developing the heated photosensitive fluorene derivative layer to remove the unexposed areas therein, thereby forming into the predetermined pattern; curing the developed photosensitive fluorene derivative layer to thereby form a core layer having the predetermined pattern on the lower cladding layer; and continuously applying a fluorene derivative layer over the lower cladding layer so as to cover the core layer and curing the fluorene derivative layer to thereby form an upper cladding layer.

3 Claims, 2 Drawing Sheets

001
PROCESS FOR PRODUCING OPTICAL WAVEGUIDE

FIELD OF THE INVENTION

The present invention relates to a process for producing an optical waveguide. More particularly, the invention relates to a process for producing an optical waveguide for optically connecting optical devices to each other.

BACKGROUND OF THE INVENTION

Optical waveguides, which are used for optically connecting optical devices to each other, are being developed because optical communication systems have come to be practically used as a result of the development of optical fibers.

It has been proposed to produce such an optical waveguide by a process in which a liquid photosensitive resin such as, e.g., an epoxy oligomer or acrylic oligomer is applied onto a lower cladding layer and the resultant coating is exposed to a light through a mask and then developed with a solvent to thereby form a core layer having a predetermined pattern (see, for example, patent document 1).

Patent Document 1: JP 10-268152 A

However, the process described in patent document 1 has limitations in improving suitability for mass production and attaining a cost reduction based on the suitability for mass production, because the optical waveguides in the process are produced on a silicon substrate by a sheet-by-sheet method (batch method).

Furthermore, the use of a liquid photosensitive resin has drawbacks that fouling of a photomask may occur in handling the liquid resin and that due to the flowability of the liquid, optical waveguides cannot be stably formed in terms of shape.

SUMMARY OF THE INVENTION

An object of the invention is to provide a process for optical-waveguide production which can attain an improvement in suitability for mass production and a cost reduction and which is excellent in working efficiency and production stability.

Other objects and effects of the invention will become apparent from the following description.

The above-described objects of the invention have been achieved by providing a process for producing an optical waveguide, comprising the steps of:

continuously applying a fluorene derivative layer onto a continuous substrate and curing the layer to thereby form a lower cladding layer;

continuously applying a photosensitive fluorene derivative layer onto the lower cladding layer;

continuously exposing the applied photosensitive fluorene derivative layer to a light through a photomask having a predetermined pattern;

continuously subjecting the exposed photosensitive fluorene derivative layer to post-exposure heating;

continuously developing the heated photosensitive fluorene derivative layer to remove the unexposed areas therein, thereby forming into the predetermined pattern;

curing the developed photosensitive fluorene derivative layer to thereby form a core layer having the predetermined pattern on the lower cladding layer; and continuously applying a fluorene derivative layer over the lower cladding layer so as to cover the core layer and curing the fluorene derivative layer to thereby form an upper cladding layer.

In the invention, the fluorene derivative layers and the photosensitive fluorene derivative layer each preferably contain a fluorene derivative represented by the following general formula (1):

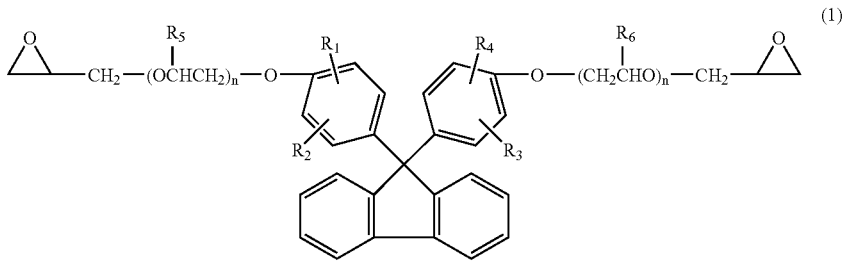

wherein $R_1$ to $R_4$ are the same or different and each represent a hydrogen atom or an alkyl group having 1 to 6 carbon atoms; $R_5$ and $R_6$ are the same or different and each represent a hydrogen atom or a methyl group; and n's each independently represent an integer of 0 to 10.

It is preferred that in general formula (1), $R_1$ to $R_6$ each be a hydrogen atom and n's each independently be 0 or 1.

In the process for producing an optical waveguide of the invention, a lower cladding layer is continuously formed on a substrate and a core layer having a predetermined pattern is continuously formed on the lower cladding layer. Furthermore, an upper cladding layer is continuously formed over the lower cladding layer so as to cover the core layer. Namely, a lower cladding layer, a core layer, and an upper cladding layer are continuously formed. Because of this, the process of the invention is significantly effective in attaining an improvement in suitability for mass production as compared with the sheet-by-sheet method (batch method). Consequently, an optical waveguide comprising a fluorene derivative resin can be efficiently produced at low cost.

Furthermore, the formation of a core layer from a photosensitive fluorene derivative layer has an advantage that there is no need of keeping the photomask apart from the photosensitive fluorene derivative layer at a given distance during exposure. Namely, the photosensitive fluorene derivative layer can be exposed, with the photomask being kept in contact with the layer. Because of this, an improvement in production efficiency can be attained.

Moreover, since the fluorene derivative layers and the photosensitive fluorene derivative layer are less apt to flow, optical waveguides can be stably formed in terms of shape.

BRIEF DESCRIPTION OF THE DRAWINGS

FIG. 1(a) shows the step of preparing a continuous substrate; FIG. 1(b) shows the step of continuously applying a fluorene derivative layer onto the substrate; FIG. 1(c) shows the step of continuously applying a photosensitive fluorene derivative layer onto an undercladding layer; FIG. 1(d) shows the step of continuously exposing the applied photosensitive fluorene derivative layer to a light through a photomask having a predetermined pattern; and FIG. 1(e) shows the step of continuously conducting the post-exposure heating of the photosensitive fluorene derivative layer which has been exposed.

FIG. 2(f) shows the step of continuously developing the photosensitive fluorene derivative layer after the post-exposure heating; FIG. 2(g) shows the step of continuously applying a fluorene derivative layer over the undercladding layer so as to cover a core layer; FIG. 2(h) shows the step of continuously etching the substrate so as to make the substrate have a pattern corresponding to optical waveguides; and FIG. 2(i) shows the step of cutting the web into optical waveguides.

Figure 1:
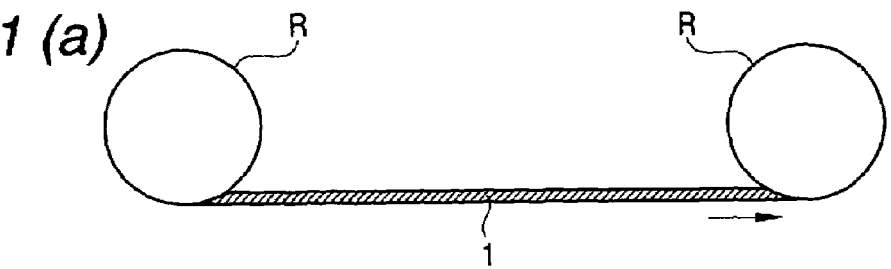
FIGS. 1(a) to 1(e) are views diagrammatically illustrating steps of one embodiment of the process for optical-waveguide production of the invention.
Figure 1:
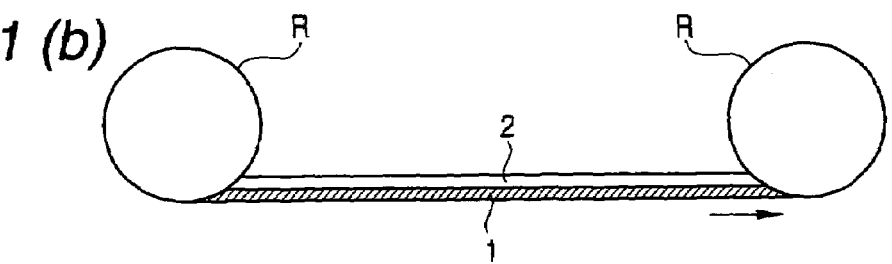
Figure 1:
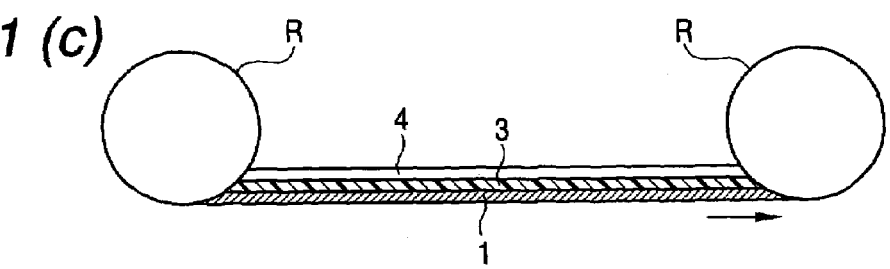
Figure 1:
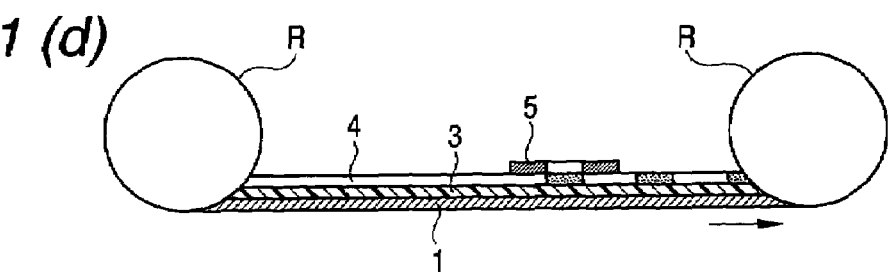
Figure 1:
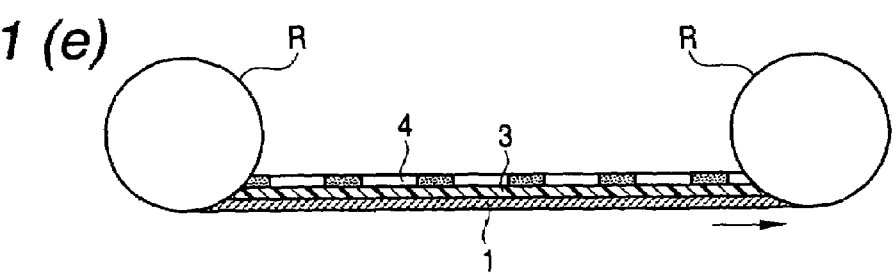

The reference numerals used in the drawings denote the followings, respectively.

1: Substrate
2: Fluorene derivative layer
3: Undercladding layer
4: Photosensitive fluorene derivative layer
5: Photomask
6: Core layer
7: Overcladding layer
8: Fluorene derivative layer
9: Optical waveguide

DETAILED DESCRIPTION OF THE INVENTION

FIG. 1 are views diagrammatically illustrating steps of one embodiment of the process for optical-waveguide production of the invention.

In the process of the invention, two rollers R are disposed face-to-face at a predetermined distance from each other, and one roller R is used for sending out and the other roller R is used for winding up, as shown in FIG. 1. The steps which will be described below each are continuously conducted between these rollers R, or are conducted at the time when the web is in the state of being wound on one of the rollers R. More specifically, in the case where the steps are conducted continuously, a given step is performed in the following manner. The web which has undergone the steps preceding the given step in the course of the production of an optical waveguide 9 and has been wound on one roller R is sent out from this roller R for the given step and is wound on the other roller R. Thus, the given step can be continuously conducted between these two rollers R.

In FIG. 1, the steps are each illustrated for reasons of convenience so that the web is sent out from one roller R and wound on the other roller R. In actual steps, however, there are cases where the web is sent out from the other roller and wound on the one roller R. There are also cases where one roller R and the other roller R alternately undergo sending out and winding up. An appropriate operation is selected from these according to actual steps.

In the process of the invention, a continuous substrate 1 is prepared first as shown in FIG. 1(a). The substrate 1 is in the form of a continuous (long sheet-shaped) flat strip. For example, a foil of a metal such as stainless steel or Alloy 42 or a film of a heat-resistant resin such as, e.g., a polyimide resin or a fluorene derivative resin is used. The thickness thereof is, for example, 5 to 200 μm, preferably 10 to 50 μm, the width thereof is, for example, 50 to 500 mm, preferably 125 to 250 mm, and the length thereof is, for example, 5 to 200 m, preferably 10 to 100 m.

The continuous substrate 1 is prepared, for example, in a rolled state in which the substrate 1 has been wound on one roller R and an end thereof has been fixed to the other roller R in preparation for sending out toward the other roller R.

In the process of the invention, a fluorene derivative layer 2 for forming an undercladding layer 3 is subsequently applied continuously on the substrate 1 as shown in FIG. 1(b). For continuously applying a fluorene derivative layer 2, a varnish containing a fluorene derivative is first applied continuously on the substrate 1 which is being sent out from one roller R toward the other roller R. Subsequently, the varnish applied is continuously predried.

The varnish containing a fluorene derivative is a solution comprising a solvent and a fluorene derivative dissolved therein. The fluorene derivative is represented, for example, by the following general formula (1):

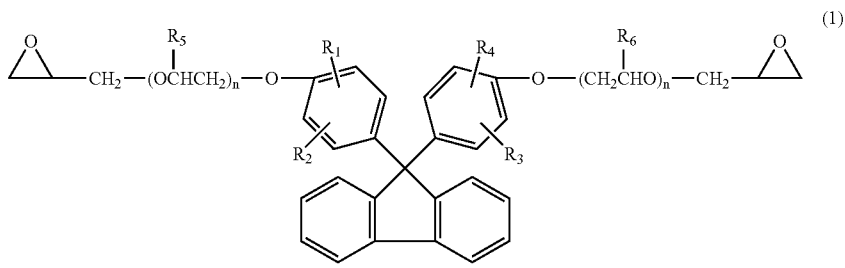

wherein $R_1$ to $R_4$ are the same or different and each represent a hydrogen atom or an alkyl group having 1 to 6 carbon atoms; $R_5$ and $R_6$ are the same or different and each represent a hydrogen atom or a methyl group; and n's each independently represent an integer of 0 to 10.

Examples of the alkyl groups having 1 to 6 carbon atoms which are represented by $R_1$ to $R_4$ in general formula (1) include methyl, ethyl, n-propyl, isopropyl, n-butyl, isobutyl, s-butyl, t-butyl, n-pentyl, neopentyl, and n-hexyl.

It is preferred that in general formula (1), $R_1$ to $R_6$ each be a hydrogen atom and n's each independently be 0 or 1. Specific examples of this fluorene derivative include bisphenoxyethanolfluorene diglycidyl ether (epoxy equivalent, 320), wherein $R_1$ to $R_6$ each are a hydrogen atom and the two n's each are 1, and bisphenolfluorene diglycidyl ether (epoxy equivalent, 234), wherein $R_1$ to $R_6$ each are a hydrogen atom and the two n's each are 0. These fluorene derivatives can be used singly or in combination of two or more thereof. It is also possible to produce such a fluorene derivative by a known method.

The proportion of the fluorene derivative in the varnish containing the fluorene derivative is, for example, 50 to 99.9% by weight, preferably 80 to 99% by weight, based on the whole varnish. Proportions thereof lower than 50% by weight may result in cases where the varnish after. application is less apt to form a film. Proportions thereof higher than 99.9% by weight may result in insufficient cure.

As the solvent may be used, for example, 2-butanone, cyclohexanone, N,N-dimethylacetamide, diglyme, diethylene glycol methyl ethyl ether, propylene glycol methyl acetate, propylene glycol monomethyl ether, tetramethylfuran, dimethoxyethane, or the like. These solvents may be used singly or in combination of two or more thereof in an appropriate amount so as to obtain a viscosity suitable for application.

The fluorene derivative-containing varnish may contain a photo-acid generator together with the fluorene derivative.

The photo-acid generator is not particularly limited, and a known one such as, e.g., an onium salt may be used. Examples of the onium salt include diazonium salts, sulfonium salts, iodonium salts, phosphonium salts, and selenonium salts. Examples of counter ions in these salts include $CF_3SO_3^-$, $BF_4^-$, $PF_6^-$, $AsF_6^-$, and $SbF_6^-$.

Specific examples of the photo-acid generator include 4,4-bis[di(β-hydroxyethoxy)phenylsulfinio]phenyl sulfide bishexafluoroantimonate, allylsulfonium hexafluorophosphate, triphenylsulfonium triflate, 4-chlorobenzenediazonium hexafluorophosphate, triphenylsulfonium hexafluoroantimonate, triphenylsulfonium hexafluorophosphate, (4-phenylthiophenyl)diphenylsulfonium hexafluoroantimonate, (4-phenylthiophenyl)diphenylsulfonium hexafluorophosphate, bis[4-diphenylsulfonio)phenyl]sulfide bishexafluoroantimonate, bis[4-(diphenylsulfonio)phenyl] sulfide bishexafluorophosphate, (4-methoxyphenyl) diphenylsulfonium hexafluoroantimonate, (4-methoxyphenyl)phenyliodonium hexafluoroantimonate, bis(4-t-butylphenyl)iodonium hexafluorophosphate, benzyltriphenylphosphonium hexafluoroantimonate, and triphenylselenonium hexafluorophosphate. These photo-acid generators can be used singly or in combination of two or more thereof.

The proportion of the photo-acid generator to be incorporated is, for example, 0.1 to 10 parts by weight, preferably 0.5 to 5 parts by weight, per 100 parts by weight of the fluorene derivative.

Besides the ingredients described above, various ingredients including, e.g., a reactive oligomer and a diluent can be incorporated into the fluorene derivative-containing varnish to the extent that the incorporation thereof does not inhibit the excellent effects of the invention.

As the monomer that constitutes the reactive oligomer, for example, an epoxy (meth)acrylate, urethane acrylate, butadiene acrylate, oxetane, or the like may be used. It is preferred to use an oxetane compound. With a mere small addition amount, an oxetane compound if added to the fluorene derivative layer or the photosensitive fluorene derivative layer described below can accelerate the curing thereof. Examples of the oxetane compound include 3-ethyl-3-hydroxymethyloxetane, 3-ethyl-3-(phenoxymethyl)oxetane, di(1-ethyl(3-oxetanyl))methyl ether, and 3-ethyl-3-(2-ethylhexylmethyl)oxetane. These reactive oligomers can be used singly or in combination of two or more thereof. The proportion of the reactive oligomer to be incorporated is, for example, 5 to 100 parts by weight per 100 parts by weight of the fluorene derivative.

Examples of the diluent include alkyl monoglycidyl ethers having 2 to 25 carbon atoms (e.g., butyl glycidyl ether and 2-ethylhexyl glycidyl ether), butanediol diglycidyl ether, 1,6-hexanediol diglycidyl ether, neopentyl glycol diglycidyl ether, dodecanediol diglycidyl ether, pentaethyltriol polyglycidyl ethers, trimethylolpropane polyglycidyl ethers, glycerol polyglycidyl ethers, phenyl glycidyl ether, resorcinol glycidyl ether, p-tert-butylphenyl glycidyl ether, allyl glycidyl ether, tetrafluoropropyl glycidyl ether, octafluoropropyl glycidyl ether, dodecafluoropentyl glycidyl ether, styrene oxide, 1,7-octadiene diepoxide, limonene diepoxide, limonene monoxide, α-pinene epoxide, β-pinene epoxide, cyclohexene epoxide, cyclooctene epoxide, and vinylcyclohexene oxide. When heat resistance and transparency are taken into account, preferred examples of the diluent include epoxies having an alicyclic structure in the molecule, such as 3,4-epoxycyclohexenylmethyl 3',4'-epoxycyclohexenecarboxylate, 3,4-epoxycyclohexenylethyl 3,4-epoxycyclohexenecarboxylate, vinylcyclohexene dioxide, allylcyclohexene dioxide, 3,4-epoxy-4-methylcyclohexyl-2-propylene oxide, and bis(3,4-epoxycyclohexyl)ether.

These diluents can be used singly or in combination of two or more thereof. The proportion of the diluent to be incorporated is, for example, 5 to 200 parts by weight per 100 parts by weight of the fluorene derivative.

By suitably regulating the proportion of the diluent, the refractive indexes of the below-described undercladding layer 3 and overcladding layer 7 and that of the below-described core layer 6 can be regulated.

The fluorene derivative can be formulated into a varnish by adding the derivative and the ingredients described above to the solvent and stirring the mixture to dissolve the ingredients added. The solid concentration of the fluorene derivative-containing varnish is, for example, 30 to 90% by weight, preferably 50 to 80% by weight.

A fluorene derivative-containing varnish may be prepared also by using, e.g., a diluent in place of the solvent, i.e., without using the solvent. Namely, a diluent is used to dissolve the other ingredients therein to prepare the varnish.

The fluorene derivative layer 2 for forming an undercladding layer 3 is formulated so that the resultant undercladding layer 3 has a lower refractive index than the core layer 6 to be formed. More specifically, the refractive indexes of the core layer 6 and undercladding layer 3 are regulated so that the value of Δ in the following equation (2) is 0.2 to 0.8 in the case of single-mode and is 0.5 to 3.0 in the case of multimode.

$$\Delta = (n_1 - n_2)/n_1 \times 100$$

(wherein $n_1$=refractive index of the core layer; $n_2$=refractive index of the undercladding layer)

The refractive indexes of the core layer 6 and undercladding layer 3 can be regulated by using two or more fluorene derivatives for each of the fluorene derivative layer 2 and the photosensitive fluorene derivative layer 4 respectively for forming the two layers 3 and 6 and suitably changing the proportions of these. In order to form an undercladding layer 3 having a lower refractive index than the core layer 6, the varnish for forming the fluorene derivative layer 2 is, for example, one which contains 100 parts by weight of bisphenoxyethanolfluorene diglycidyl ether and 10 to 70 parts by weight of bisphenolfluorene diglycidyl ether. Through curing, this varnish gives an undercladding layer 3 having a refractive index of 1.55 to 1.62.

For continuously applying the fluorene derivative-containing varnish on the substrate 1, a known coating technique is used, such as casting, spray coating, coating with a dam coater, comma coater, or reverse-roll coater, or the like. The subsequent predrying can be conducted, for example, with a drying oven having a length of 2 to 5 m installed between the two rollers R. The substrate 1 on which the fluorene derivative-containing varnish has been applied can be dried by continuously passing it through the drying oven while regulating the drying temperature and traveling speed to 50 to 120° C. and 0.1 to 0.5 m/min, respectively. As a result, a fluorene derivative layer 2 is formed as a film having substantially no residual tackiness on the surface (surface tack).

In this step, when the substrate 1 which has passed through the drying oven is wound on the other roller R, a spacer is preferably interposed between the adjacent layers of the substrate 1 in order to prevent the fluorene derivative layer 2 formed on the substrate 1 from coming into contact with the substrate 1 to be wound thereon. By thus winding the substrate 1, the distance between the layers is kept at a predetermined value. Also in every subsequent step in which the web is wound, a spacer is preferably interposed to keep the distance between the layers being wound at a predetermined value.

In the process of the invention, the fluorene derivative layer 2 formed on the substrate 1 is then allowed to cure to thereby form an undercladding layer 3 as a lower cladding layer.

Methods for curing the fluorene derivative layer 2 are not particularly limited. It is, however, preferred to use a known method such as, e.g., the exposure method or a combination of exposure and heating.

In the case where the fluorene derivative layer 2 is allowed to cure by the exposure method, an ultraviolet illuminator having an automatic conveying function, for example, is disposed between the two rollers R. The fluorene derivative layer 2 is passed through the illuminator to exposure the layer to light. The ultraviolet exposure dose is, for example, 10 to 10,000 mJ/cm$^2$, preferably 50 to 5,000 mJ/cm$^2$.

In the case where the fluorene derivative layer 2 is allowed to cure by a combination of exposure and heating, the fluorene derivative layer 2 is, for example, exposed to light by the exposure method described above and subsequently continuously heated by the following heating method.

In the case where the fluorene derivative layer 2 is allowed to cure by the heating method, a drying oven having an automatic conveying function, for example, is disposed between the two rollers R and the fluorene derivative layer 2 is passed through the oven and heated. Alternatively, the fluorene derivative layer 2 which has been wound on the other roller R is placed, in the wound state together with the roller R, in a heating oven and heated therein. The heating temperature is, for example, 80 to 250° C. When the fluorene derivative layer 2 is heated by being passed through the drying oven, the traveling speed is regulated to, for example, 0.1 to 0.5 m/min.

Thus, the fluorene derivative layer 2 cures to form an undercladding layer 3 comprising a fluorene derivative resin.

The thickness of the undercladding layer 3 is, for example, 5 to 100 μm in the case of a multimode optical waveguide, and is, for example, 1 to 20 μm in the case of a single-mode optical waveguide.

Thereafter, in the process of the invention, a photosensitive fluorene derivative layer 4 for forming a core layer 6 is continuously applied onto the undercladding layer 3 as shown in FIG. 1(c).

For continuously applying a photosensitive fluorene derivative layer 4, a varnish containing a photosensitive fluorene derivative is first applied continuously onto the undercladding layer 3 formed on the substrate 1 which is being sent out from one roller R toward the other roller R. Subsequently, the varnish applied is predried.

The photosensitive fluorene derivative is one which comprises the fluorene derivative described above and a photo-acid generator as essential components. The varnish containing a photosensitive fluorene derivative is prepared as a solution comprising a solvent and, dissolved therein, the fluorene derivative and photo-acid generator.

The varnish containing a photosensitive fluorene derivative is prepared in the same manner as for the fluorene derivative-containing varnish for forming a fluorene derivative layer 2, except that a photo-acid generator is incorporated as an essential ingredient.

The photosensitive fluorene derivative layer 4 for forming a core layer 6 is formulated so that the resultant core layer 6 has a higher refractive index than the undercladding layer 3 as stated above. The refractive index of the layer formed by curing the photosensitive fluorene derivative layer 4 is regulated by using two or more fluorene derivatives and suitably changing the proportions of these, as in the case of the fluorene derivative layer 2 described above. In order to form a core layer 6 having a higher refractive index than the undercladding layer 3, the varnish for forming the photosensitive fluorene derivative layer 4 is, for example, one which contains 100 parts by weight of bisphenoxyethanolfluorene diglycidyl ether and 10 to 70 parts by weight of bisphenolfluorene diglycidyl ether. Through curing, this varnish gives a core layer 6 having a refractive index of 1.55 to 1.62.

For continuously applying the varnish containing a photosensitive fluorene derivative onto the undercladding layer 3, a known coating technique is used, such as casting, spray coating, coating with a dam coater, comma coater, or reverse-roll coater, or the like. The subsequent predrying can be conducted, for example, with a drying oven having a length of 2 to 5 m installed between the two rollers R. The substrate 1 having the undercladding layer 3 on which the varnish containing a photosensitive fluorene derivative has been applied is continuously passed through the drying oven while regulating the drying temperature and traveling speed to 50 to 120° C. and 0.1 to 0.5 m/min, respectively. As a result, a photosensitive fluorene derivative layer 4 is formed as a film having substantially no residual tackiness on the surface (surface tack).

Thereafter, in the process of the invention, the photosensitive fluorene derivative layer 4 applied is continuously exposed to a light through a photomask 5 having a predetermined pattern as shown in FIG. 1(d).

The photomask 5 to be used is a photomask formed so as to have the same pattern as a predetermined pattern which enables the exposed areas of the photosensitive fluorene derivative layer 4 to remain after subsequent development to give a core layer 6 corresponding to the light-transmitting parts.

The exposure is conducted in the following manner. The photomask 5 is disposed between the two rollers R, and the photosensitive fluorene derivative layer 4 formed on the undercladding layer 3 on the substrate 1 which is being sent out from one roller R toward the other roller R is continuously exposed to a light. As an illuminator, for example, an illuminator having an automatic conveying function is used.

Methods for exposure are not particularly limited, and a known exposure technique may be used, such as, e.g., the contact exposure technique in which the photosensitive fluorene derivative layer 4 is brought into direct contact with the photomask 5, the proximity exposure technique in which the photosensitive fluorene derivative layer 4 and the photomask 5 are spaced from each other by a slight gap, or the projection exposure technique. Since the photosensitive fluorene derivative layer 4 has substantially no surface tack, it is preferred to use the contact exposure technique in which the photomask 5 is brought into contact with the photosensitive fluorene derivative layer 4. Because the photomask 5 is brought into direct contact with the photosensitive fluorene derivative layer 4 in the contact exposure technique, the pattern formation of the latent image can be ensured while attaining an improvement in working efficiency.

The light to be used for the exposure is, for example, visible light, ultraviolet, infrared, X-rays, α-rays, β-rays, γ-rays, or the like. It is preferred to use ultraviolet. When ultraviolet is used, the photosensitive layer can be irradiated at a high energy and a high curing rate can be obtained. In addition, the illuminator is small and inexpensive, whereby a reduction in production cost can be attained. More specifically, a light source such as, e.g., a low-pressure mercury lamp, high-pressure mercury lamp, or ultrahigh-pressure mercury lamp is used to irradiate the photosensitive layer 4 with ultraviolet. The exposure dose of ultraviolet is, for example, 10 to 10,000 $mJ/cm^2$, preferably 50 to 5,000 $mJ/cm^2$.

In the process of the invention, the photosensitive fluorene derivative layer 4 which has been exposed is then continuously subjected to post-exposure heating as shown in FIG. 1(e). This post-exposure heating can be conducted, for example, with a heating oven having a length of 2 to 5 m installed between the two rollers R. The substrate 1 having the undercladding layer 3 on which the photosensitive fluorene derivative layer 4 has been formed is continuously passed through the heating oven while regulating the heating temperature and traveling speed to 80 to 250° C., preferably 100 to 200° C., and 0.1 to 0.5 m/min, respectively. This post-exposure heating reduces the solubility of the exposed areas in a developing liquid and gives a negative latent image in which the unexposed areas are dissolved away in the subsequent development.

Figure 2:
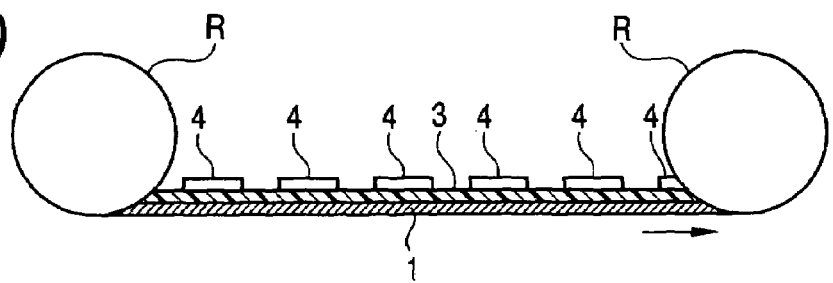
FIGS. 2(f) to 2(i) are views diagrammatically illustrating steps of one embodiment of the process for optical-waveguide production of the invention, subsequent to the steps shown in FIG. 1.
Figure 2:
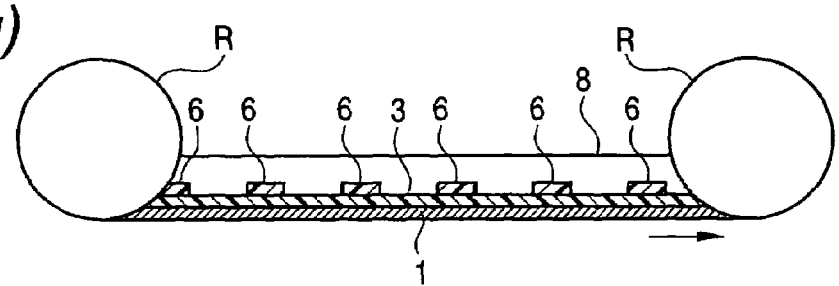
Figure 2:
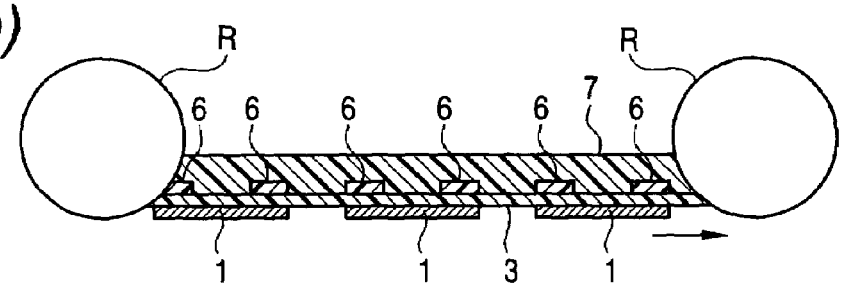
Figure 2:
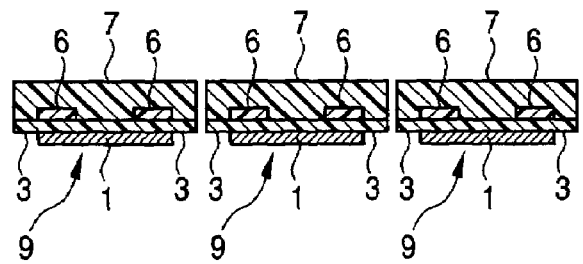

Subsequently, in the process of the invention, the photosensitive fluorene derivative layer 4 which has undergone the post-exposure heating is continuously developed as shown in FIG. 2(f). This development is conducted, for example, with a developing tank having a length of 2 to 5 m installed between the two rollers R. The substrate 1 having the undercladding layer 3 on which the photosensitive fluorene derivative layer 4 has been formed is continuously passed through the developing tank while regulating the traveling speed to 0.2 to 0.5 m/min. Methods for development are not particularly limited, and a known technique such as, e.g., the immersion method or spraying method is used. The development temperature is generally 25 to 50° C. As the developing liquid may be used a polar organic solvent such as, e.g., acetonitrile. The developing tank preferably is one which has a developing chamber and a rinsing chamber.

By this development, the unexposed areas in the exposed photosensitive fluorene derivative layer 4 are removed to form the photosensitive fluorene derivative layer 4 into the predetermined pattern.

In the process of the invention, the developed photosensitive fluorene derivative layer 4 is allowed to cure to thereby form a core layer 6 having the predetermined pattern on the undercladding layer 3. For curing the photosensitive fluorene derivative layer 4, a known method may be used, such as, e.g., the heating method, the exposure method, or a combination of these.

In the case where the developed photosensitive fluorene derivative layer 4 is allowed to cure by the heating method, a drying oven having an automatic conveying function, for example, is disposed between the two rollers R and the developed photosensitive fluorene derivative layer 4 is passed through the oven and heated. Alternatively, the developed photosensitive fluorene derivative layer 4 which has been wound on the other roller R is placed, in the wound state together with the roller R, in a heating oven and heated therein. The heating temperature is, for example, 80 to 250° C. When the developed photosensitive fluorene derivative layer 4 is heated by being passed through the drying oven, the traveling speed is regulated to, for example, 0.1 to 0.5 m/min.

In the case where the developed photosensitive fluorene derivative layer 4 is allowed to cure by the exposure method, an ultraviolet illuminator having an automatic conveying function, for example, is disposed between the two rollers R. The developed photosensitive fluorene derivative layer 4 is passed through the illuminator to exposure the layer to light. The ultraviolet exposure dose is, for example, 10 to 10,000 $mJ/cm^2$, preferably 50 to 5,000 $mJ/cm^2$.

In the case where the developed photosensitive fluorene derivative layer 4 is allowed to cure by a combination of exposure and heating, it is, for example, exposed to light by the exposure method described above and subsequently continuously heated by the heating method described above.

Thus, the developed photosensitive fluorene derivative layer 4 cures to form a core layer 6 comprising a fluorene derivative resin and having the predetermined pattern.

The thickness of the core layer 6 is, for example, 20 to 100 μm in the case of a multimode optical waveguide, and is, for example, 2 to 10 μm in the case of a single-mode optical waveguide.

In the process of the invention, a fluorene derivative layer 8 is subsequently applied continuously over the undercladding layer 3 so as to cover the core layer 6 as shown in FIG. 2(g). For continuously applying a fluorene derivative layer 8, a varnish containing a fluorene derivative is continuously applied, so as to cover the core layer 6, over the undercladding layer 3 formed on the substrate 1 which is being sent out from one roller R toward the other roller R, in the same manner as described above. The varnish applied is then continuously predried.

The varnish containing a fluorene derivative is the same as the above-described varnish containing a fluorene derivative. This varnish is formulated so that the resultant overcladding layer 7 has a lower refractive index than the core layer 6. It is preferred to use a varnish having the same formulation as the fluorene derivative-containing varnish used for forming the fluorene derivative layer 2.

For continuously applying the varnish containing a fluorene derivative on the undercladding layer 3, a known coating technique is used as in steps described above, such as casting, spray coating, coating with a dam coater, comma coater, or reverse-roll coater, or the like. The subsequent predrying also can be conducted, for example, with a drying oven having a length of 2 to 5 m installed between the two rollers R, as in the steps described above. The substrate 1 having the undercladding layer 3 on which the varnish containing a fluorene derivative has been applied is continuously passed through the drying oven while regulating the drying temperature and traveling speed to 50 to 120° C. and 0.1 to 0.5 m/min, respectively.

Subsequently, in the process of the invention, the fluorene derivative layer 8 formed over the undercladding layer 3 is allowed to cure to thereby form an overcladding layer 7 as an upper cladding layer.

Methods for curing the fluorene derivative layer 8 are not particularly limited. It is, however, preferred to use a known method such as, e.g., the heating method, the exposure method, or a combination of these as in the steps described above.

The thickness of the overcladding layer 7 is, for example, 5 to 100 μm in the case of a multimode optical waveguide, and is, for example, 1 to 20 μm in the case of a single-mode optical waveguide.

Subsequently, in the process of the invention, the substrate 1 is continuously etched so as to result in a pattern corresponding to optical waveguides 9 as shown in FIG. 2(h). The etching is not particularly limited and can be conducted, for example, in the following manner. The surface of the substrate 1 is continuously covered with an etching resist comprising a dry film or the like so as to result in that pattern. Thereafter, the substrate 1 is continuously wet-etched with, e.g., a ferric chloride solution and the etching resist is then continuously stripped off.

In the process of the invention, the web is then cut into optical waveguides 9 with a cutter, high-precision die, or the like as shown in FIG. 2(i). Thus, optical waveguides 9 are obtained. This cutting into optical waveguides 9 is conducted according to the pattern of the optical waveguides 9.

In the case where adhesion between the substrate 1 and the undercladding layer 3 is insufficient in the explanations given above, an adhesive layer comprising, for example, a fluorene derivative resin may be interposed between these. Alternatively, the surface of the substrate 1 may be subjected to a surface treatment for enhancing adhesion.

According to the process for producing an optical waveguide 9 described above, an undercladding layer 3 is continuously formed on a substrate 1 and a core layer 6 having a predetermined pattern is continuously formed on the undercladding layer 3. Furthermore, an overcladding layer 7 is continuously formed over the undercladding layer 3 so as to cover the core layer 6. Namely, an undercladding layer 3, core layer 6, and overcladding layer 7 are continuously formed. Because of this, the process is significantly effective in attaining an improvement in suitability for mass production as compared with the sheet-by-sheet method (batch method). Consequently, an optical waveguide 9 comprising a fluorene derivative resin can be efficiently produced at low cost.

Furthermore, in the process for producing an optical waveguide 9, a photosensitive fluorene derivative layer 4 having substantially no surface tack can be formed because the photosensitive fluorene derivative layer 4, which is for forming the core layer 6, is formed from a photosensitive fluorene derivative comprising a fluorene derivative and a photo-acid generator. Because of this, there is no need of keeping the photomask 5 apart from the photosensitive fluorene derivative layer 4 at a predetermined distance in the exposure for forming the core layer 6. Namely, the photosensitive fluorene derivative layer 4 can be exposed by the contact exposure technique, with the photomask 5 being kept in contact with the photosensitive fluorene derivative layer 4.

Consequently, even when the photomask 5 is brought into contact with the photosensitive fluorene derivative layer 4, the photomask 5 can be inhibited from being fouled, while securing reliable pattern formation. As a result, in the process for producing an optical waveguide 9, quality and production efficiency can be improved.

Moreover, according to this process for producing an optical waveguide 9, the varnishes respectively containing a fluorene derivative and a photosensitive fluorene derivative can be prepared so as to have a high viscosity. Because of this, these varnishes each can be applied thickly to form a thick fluorene derivative layer 2 or a thick photosensitive fluorene derivative layer 4. In addition, since a fluorene derivative layer 2 or a photosensitive fluorene derivative layer 4 can be formed so as to be less flowable, optical waveguides 9 can be stably formed in terms of shape.

The optical waveguides 9 obtained by this process can be used in various fields as optical waveguides 9 which have excellent shape stability and satisfactory quality.

The optical waveguides 9 obtained can be used for optically connecting various optical devices without particular limitations. Specifically, the optical waveguides are used as a straight optical waveguide, bend optical waveguide, crossing optical waveguide, Y-branched optical waveguide, slab optical waveguide, Mach-Zehnder type optical waveguide, AWG type optical waveguide, grafting optical waveguide, optical waveguide lens, or the like.

Examples of optical devices connected by these optical waveguides include wavelength filters, optical switches, optical branch units, optical multiplexers, optical multiplexers/demultiplexers, optical amplifiers, wavelength modulators, wavelength division multiplexers, optical splitters, directional couplers, and optical transmission modulus having a laser diode or photodiode hybrid-integrated therewith.

EXAMPLES

The present invention will be illustrated in greater detail with reference to the following Examples, but the invention should not be construed as being limited thereto.

Preparation of Varnishes

According to each of the formulations shown in Table 1, the ingredients were mixed and dissolved using cyclohexanone as a solvent. Thus, a fluorene derivative varnish A and a photosensitive fluorene derivative varnish B were prepared. The refractive indexes, as measured at a wavelength of 633 nm, of cured resins respectively obtained by curing these varnishes are also shown in Table 1.

TABLE 1

(parts by weight)

| Varnish | Fluorene derivative varnish A | Photosensitive fluorene derivative varnish B |
|---|---|---|
| Fluorene derivative 1 | 83 | 67 |
| Fluorene derivative 2 |  | 33 |
| Diluent | 17 |  |
| Photo-acid generator |  | 1 |
| Refractive index of cured resin (measuring wavelength, 633 nm) | 1.585 | 1.617 |

Fluorene derivative 1:
Bisphenoxyethanolfluorene diglycidyl ether (represented by general formula (1) wherein $R_1$ to $R_6$ each are a hydrogen atom or n = 1)
Fluorene derivative 2:
Bisphenolfluorene diglycidyl ether (represented by general formula (1) wherein $R_1$ to $R_6$ each are a hydrogen atom and n = 0).
Diluent:
3,4-epoxycyclohexenylmethyl 3',4'-epoxycyclohexenecarboxylate (trade name Celoxide 2021P, manufactured by Daicel Chemical Industries, Ltd.)
Photo-acid generator:
50% propylene carbonate solution of 4,4-bis[di(β-hydroxyethoxy)phenylsulfinio]phenyl sulfide bishexafluoroantimonate Production of Optical Waveguides The following steps were conducted by the roll-to-roll method to produce optical waveguides.

First, a substrate made of a stainless-steel foil having a thickness of 25 μm, width of 125 mm, and length of 100 m which had been wound on a roller was prepared (see FIG. 1(a)). Subsequently, the fluorene derivative varnish A prepared above was continuously applied onto the substrate. The applied varnish was predried by passing the web through a drying oven having a length of 2 m (drying temperature, 100° C.; traveling speed, 0.2 m/min) installed between the two rollers to thereby form a fluorene derivative layer (see FIG. 1(b)). Thereafter, this web was wound on a roller. In the winding, a spacer having a thickness of 1 mm was interposed between the layers being wound (a spacer was interposed in the same manner also in the subsequent steps, although the indication thereof is omitted).

Subsequently, an ultraviolet illuminator having an automatic conveying function was used to irradiate the whole fluorene derivative layer in an exposure dose of 2,000 mJ/cm$^2$. This web was wound on a roller and then passed through a heating oven having a length of 2 m (drying temperature, 150° C.; traveling speed, 0.2 m/min) installed between the two rollers. Thus, the fluorene derivative layer was allowed to cure to form an undercladding layer. This undercladding layer had a thickness of 20 µm.

Thereafter, the photosensitive fluorene derivative varnish B prepared above was continuously applied onto the undercladding layer. The applied varnish was predried by passing the web through a drying oven having a length of 2 m (drying temperature, 100° C.; traveling speed, 0.2 m/min) installed between the two rollers to thereby form a photosensitive fluorene derivative layer (see FIG. 1(c)).

This photosensitive fluorene derivative layer was subsequently exposed continuously to a light with an ultraviolet illuminator having an automatic conveying function (see FIG. 1(d)). In the exposure method employed, a synthetic-quartz-based chrome photomask having a 50 µm-wide linear optical-waveguide pattern formed in a 10 cm×10 cm region was used to conduct contact exposure to i-line (365 nm) as a radiation in an exposure dose of 5,000 mJ/cm$^2$. The photosensitive fluorene derivative layer was thus exposed at an interval of 12 cm.

Thereafter, the photosensitive fluorene derivative layer which had been exposed was subjected to post-exposure heating in which the layer was passed through a heating oven having a length of 2 m (heating temperature, 100° C.; traveling speed, 0.1 m/min) installed between the two rollers (see FIG. 1(e)).

Subsequently, the photosensitive fluorene derivative layer which had undergone the post-exposure heating was continuously developed (see FIG. 2(f)) using a spray type developing tank which had been installed between the two rollers and comprised a developing chamber having a length of 1 m, first rinsing chamber having a length of 1 m, and second rinsing chamber having a length of 3 m. In the development, acetonitrile was used as a developing liquid, and the fluorene derivative layer was continuously passed successively through these chambers at a traveling speed of 1.0 m/min while regulating the liquid temperature in the developing chamber, water temperature in the first rinsing chamber, and water temperature in the second rinsing chamber to 20° C., 35° C., and 25° C., respectively. Thereafter, the web was dewatered and then wound on a roller. The photosensitive fluorene derivative layer after the development had a thickness of about 50 µm, and it was ascertained that the unexposed areas were wholly removed by the development.

Subsequently, the photosensitive fluorene derivative layer after the development was allowed to cure by passing the web through a drying oven having a length of 2 m (drying temperature, 150° C.; traveling speed, 0.2 m/min) installed between the two rollers. Thus, a core layer comprising a fluorene derivative resin was formed. This core layer was formed so as to have a pattern having a square section with a width of 50 µm and a thickness of 50 µm.

The fluorene derivative varnish A was thereafter applied continuously over the undercladding layer so as to cover the core layer. This varnish was then predried by passing the web through a drying oven having a length of 2 m (drying temperature, 100° C.; traveling speed, 0.2 m/min) installed between the two rollers to thereby form a fluorene derivative layer (see FIG. 2(g)). This web was then wound on a roller.

Subsequently, an ultraviolet illuminator having an automatic conveying function was used to irradiate the whole fluorene derivative layer in an exposure dose of 2,000 mJ/cm$^2$. This web was wound on a roller and then passed through a heating oven having a length of 2 m (heating temperature, 150° C.; traveling speed, 0.2 m/min) installed between the two rollers. Thus, the fluorene derivative layer was allowed to cure to form an overcladding layer (see FIG. 2(h)). This overcladding layer had a thickness of 80 µm.

Thereafter, the surface of the substrate was continuously covered with an etching resist comprising a dry film so as to result in a pattern corresponding to optical waveguides. This substrate was continuously wet-etched with a ferric chloride solution and the etching resist was then stripped off continuously (see FIG. 2(h)). Thus, the substrate was made to have the pattern corresponding to optical waveguides.

The web thus processed was then cut with a cutter into optical waveguides. Thus, optical waveguides were obtained. (see FIG. 2(i)).

While the present invention has been described in detail and with reference to specific embodiments thereof, it will be apparent to one skilled in the art that various changes and modifications can be made therein without departing from the spirit and scope thereof.

The present application is based on Japanese Patent Application No. 2004-226016 filed Aug. 2, 2004, the contents thereof being herein incorporated by reference.

What is claimed is:

1. A process for producing an optical waveguide, comprising the steps of:

continuously applying a fluorene derivative layer onto a continuous substrate and curing the layer to thereby form a lower cladding layer;

continuously applying a photosensitive fluorene derivative layer onto the lower cladding layer;

continuously exposing the applied photosensitive fluorene derivative layer to a light through a photomask having a predetermined pattern;

continuously subjecting the exposed photosensitive fluorene derivative layer to post-exposure heating;

continuously developing the heated photosensitive fluorene derivative layer to remove the unexposed areas therein, thereby forming into the predetermined pattern;

curing the developed photosensitive fluorene derivative layer to thereby form a core layer having the predetermined pattern on the lower cladding layer; and continuously applying a fluorene derivative layer over the lower cladding layer so as to cover the core layer and curing the fluorene derivative layer to thereby form an upper cladding layer.

2. The process for producing an optical waveguide of claim 1, wherein the fluorene derivative layers and the photosensitive fluorene derivative layer each contain a fluorene derivative represented by the following general formula (1):

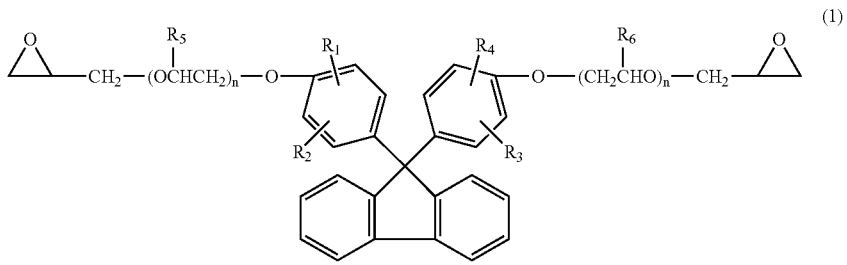

wherein $R_1$ to $R_4$ are the same or different and each represent a hydrogen atom or an alkyl group having 1 to 6 carbon atoms; $R_5$ and $R_6$ are the same or different and each represent a hydrogen atom or a methyl group; and n's each independently represent an integer of 0 to 10.

3. The process for producing an optical waveguide of claim 2, wherein in general formula (1), $R_1$ to $R_6$ each are a hydrogen atom and n's each independently are 0 or 1.

* * * * *